(12) United States Patent
White et al.

(10) Patent No.: US 12,353,404 B1
(45) Date of Patent: Jul. 8, 2025

(54) METHODS AND SYSTEMS FOR FACILITATING PROVABLE DATA INTEGRITY FOR DATA STORES

(71) Applicant: SPACE AND TIME LABS, INC., San Clemente, CA (US)

(72) Inventors: Jay Thomas White, Lexington, KY (US); Scott Edward Daly Dykstra, Fort Myers, FL (US)

(73) Assignee: SPACE AND TIME LABS, INC., San Clemente, CA (US)

( * ) Notice: Subject to any disclaimer, the term of this patent is extended or adjusted under 35 U.S.C. 154(b) by 0 days.

(21) Appl. No.: 18/941,202

(22) Filed: Nov. 8, 2024

(51) Int. Cl.
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
CPC .............................. G06F 16/2379; G06F 16/27
See application file for complete search history.

(56) References Cited

U.S. PATENT DOCUMENTS

| | | | | |
|---|---|---|---|---|
| 2018/0082291 | A1* | 3/2018 | Allen | H04L 9/3239 |
| 2019/0163896 | A1* | 5/2019 | Balaraman | H04L 9/3226 |
| 2019/0288850 | A1* | 9/2019 | Beecham | G06F 21/6209 |
| 2020/0394322 | A1* | 12/2020 | Ramos | G06F 21/64 |
| 2020/0412525 | A1* | 12/2020 | Katsak | H04L 9/50 |
| 2021/0209077 | A1* | 7/2021 | Snellman | G06F 16/219 |
| 2022/0019901 | A1* | 1/2022 | Saleh | H04L 9/50 |
| 2022/0229805 | A1* | 7/2022 | Chakeres | G06F 11/2094 |

FOREIGN PATENT DOCUMENTS

WO 2024233877 A2 11/2024

* cited by examiner

*Primary Examiner* — Kris E Mackes
(74) *Attorney, Agent, or Firm* — Troutman Pepper Locke LLP (57) ABSTRACT

Methods, non-transitory computer readable media, and transaction nodes are disclosed that update a cryptographic commitment to a data blob (e.g., Structured Query Language (SQL) database table or block of transactions) with respect to data to be inserted into the data blob and ingested via communication network(s) from a data source. The updated cryptographic commitment is then stored in a distributed ledger replicated at each of the transaction nodes upon obtaining agreement on the updated cryptographic commitment with one or more of the transaction nodes based on a consensus protocol. The ingested data is inserted (e.g., by one of the transaction nodes or directly by a data source) in the data blob in a data store (e.g., a SQL database or blockchain). By maintaining redundant copies of a ledger of cryptographic commitments across transaction nodes, this technology facilitates query verification with improved scalability, efficiency, and security, among other advantages.

30 Claims, 5 Drawing Sheets

METHODS AND SYSTEMS FOR FACILITATING PROVABLE DATA INTEGRITY FOR DATA STORES

FIELD

This technology generally relates to data security for data stores and, more particularly, to methods and devices for facilitating provable data integrity for data stores to reduce tampering and enable efficient data verification.

BACKGROUND

Outsourced databases are increasingly utilized for data storage and retrieval. Databases can have any number of topologies, including centralized databases, as well as decentralized databases hosted across a plurality of servers, other computing devices, or other hardware resources (e.g., in a cloud network). As one example, a blockchain network includes decentralized server or transaction nodes that maintain a database in the form of a distributed ledger that encapsulates data stored on the blockchain network.

However, malicious third parties often attempt to tamper with the stored data and/or the results of queries sent from the hosted databases. In a blockchain network, for example, nodes that comprise the decentralized database are generally untrustworthy and susceptible to tampering and other malicious activity, particularly when bad actors are incentivized by the nature of the stored data (e.g., cryptocurrency data). While both centralized and decentralized databases can be untrustworthy, a completely decentralized topology is particularly susceptible to malicious activity because anyone has the ability to act as a database host, which increases the risk of tampering and decreases the trustworthiness of query results returned from the database.

Consensus mechanisms can be employed by blockchain network nodes to resolve disputes and ensure consistency and agreement with respect to data (e.g., blockchain transactions) ingested by decentralized or outsourced databases. However, because a decentralized database may be hosted by malicious or faulty participants (e.g., hosts of blockchain network nodes), there is no efficient way to provide verified and tamper-evident data from decentralized databases for downstream applications and computations (e.g., Structured Query Language (SQL) query results or map-reduce operations, among many others). Existing solutions require costly coordination of the entire network to attempt to mitigate these issues.

SUMMARY

In one example, a non-transitory computer readable medium is disclosed that has stored thereon instructions comprising executable code that, when executed by one or more processors of one of a plurality of transaction nodes in a decentralized network, causes the processors to update a cryptographic commitment to a data blob with respect to data to be inserted into the data blob and ingested via one or more first communication networks from at least one data source. The executable code, when executed by the processors, further causes the processors to store the updated cryptographic commitment in a distributed ledger replicated at each of the transaction nodes upon obtaining agreement on the updated cryptographic commitment with a first one or more of the transaction nodes based on a consensus protocol. The ingested data is inserted, such as by one of the transaction nodes or directly by a data source, for example, in the data blob in a data store.

In another example, a transaction node is disclosed that is in a decentralized network that comprises a plurality of transaction nodes. The transaction node comprises memory having instructions stored thereon and one or more processors coupled to the memory and configured to execute the instructions to update a cryptographic commitment to a data blob with respect to data to be inserted into the data blob and ingested via one or more first communication networks from at least one data source. The processors are further configured to execute the instructions to store the updated cryptographic commitment in a distributed ledger replicated at each of the transaction nodes upon obtaining agreement on the updated cryptographic commitment with a first one or more of the transaction nodes based on a consensus protocol. The ingested data is inserted, such as by one of the transaction nodes or directly by a data source, for example, in the data blob in a data store.

In yet another example, a method implemented by one of a plurality of transaction nodes in a decentralized network is disclosed. The method includes updating a cryptographic commitment to a data blob with respect to data to be inserted into the data blob and ingested via one or more first communication networks from at least one data source. The method further includes storing the updated cryptographic commitment in a distributed ledger replicated at each of the transaction nodes upon obtaining agreement on the updated cryptographic commitment with a first one or more of the transaction nodes based on a consensus protocol. The ingested data is inserted, such as by one of the transaction nodes or directly by a data source, for example, in the data blob in a data store.

This technology provides a number of advantages including methods, non-transitory computer readable media, and transaction nodes that advantageously facilitate trust for query results generated from untrusted data stores. In some examples, this technology leverages a Byzantine Fault Tolerant (BFT) or other consensus protocol to maintain and update cryptographic commitments representing data blobs (e.g., tables of a Structured Query Language (SQL) database or blocks of transactions in a blockchain). The cryptographic commitments facilitate query result verification for downstream applications requiring verifiable and tamper-evident data, such as zero-knowledge (ZK) proofs of special computations over data (e.g., SQL database queries or map-reduce operations over large data ledgers), for which the integrity of the underlying data must be provably maintained.

Accordingly, this technology facilitates query verification with significantly improved scalability, efficiency, and security. By maintaining redundant copies of a ledger of cryptographic commitments across multiple transaction nodes, this technology provides high availability and fault tolerance, as well as resilience against faulty or malicious transaction nodes, ensuring the integrity and availability of the system. The consensus mechanism provides robustness against various types of failures and attacks and the use of cryptographic commitments ensures that any tampering with the stored data can be efficiently detected. Moreover, the cryptographic commitments are updatable to enable efficient proof (e.g., ZK proof) generation and verification for SQL and other queries, enhancing the usability of the ledger in cryptographic applications.

DETAILED DESCRIPTION

Figure 1:
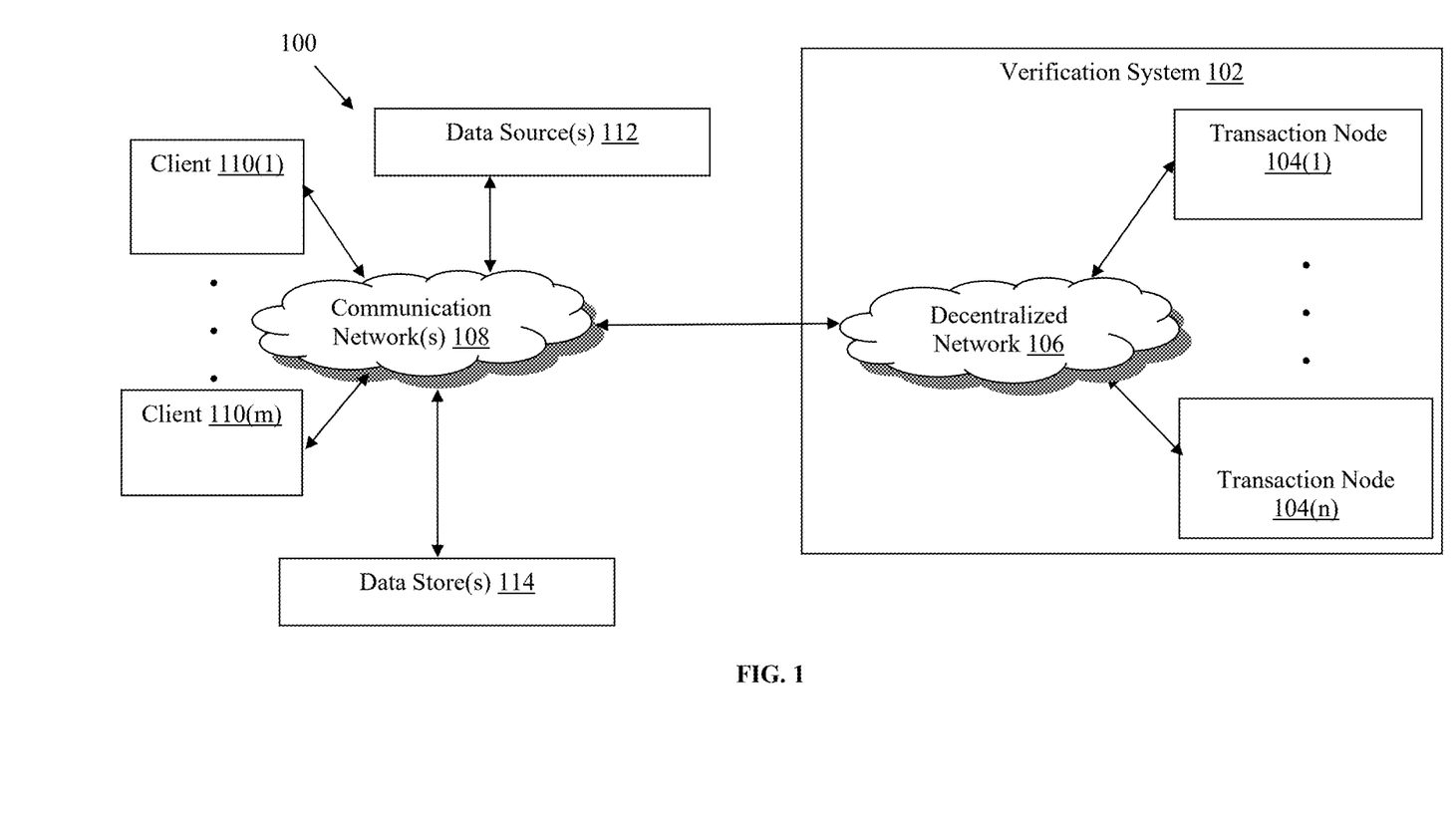
FIG. 1 is a block diagram of an exemplary network environment with a verification system that includes a decentralized network with transaction nodes.

Referring to FIG. 1, an exemplary network environment 100 is illustrated that includes a verification system 102 with transaction nodes 104(1)-104(n) coupled together via a decentralized network 106, which can be a blockchain network hosting a distributed ledger, for example. The decentralized network 106 is coupled via communication network(s) 108, to clients 110(1)-110(m), data source(s) 112, and a data store 114. The network environment 100 may include other network devices such as one or more routers or switches, for example, which are known in the art and thus will not be described herein. This technology provides a number of advantages including methods, non-transitory computer readable media, systems, and devices that advantageously maintain redundant copies of a ledger of cryptographic commitments to facilitate query verification with improved scalability, efficiency, and security, among other advantages.

In this particular example, the clients 110(1)-110(m), data source(s) 112, data store(s) 114, and transaction nodes 104(1)-104(n) are disclosed in FIG. 1 as dedicated hardware devices. However, one or more of the clients 110(1)-110(m), data source(s) 112, data store(s) 114, and transaction nodes 104(1)-104(n) can also be implemented in software within one or more other devices in the network environment 100. As one example, the data store(s) 114, as well as any of its components or applications, can be implemented as software executing on one of the transaction nodes 104(1)-104(n), and many other permutations and types of implementations and network topologies can also be used in other examples.

Figure 2:
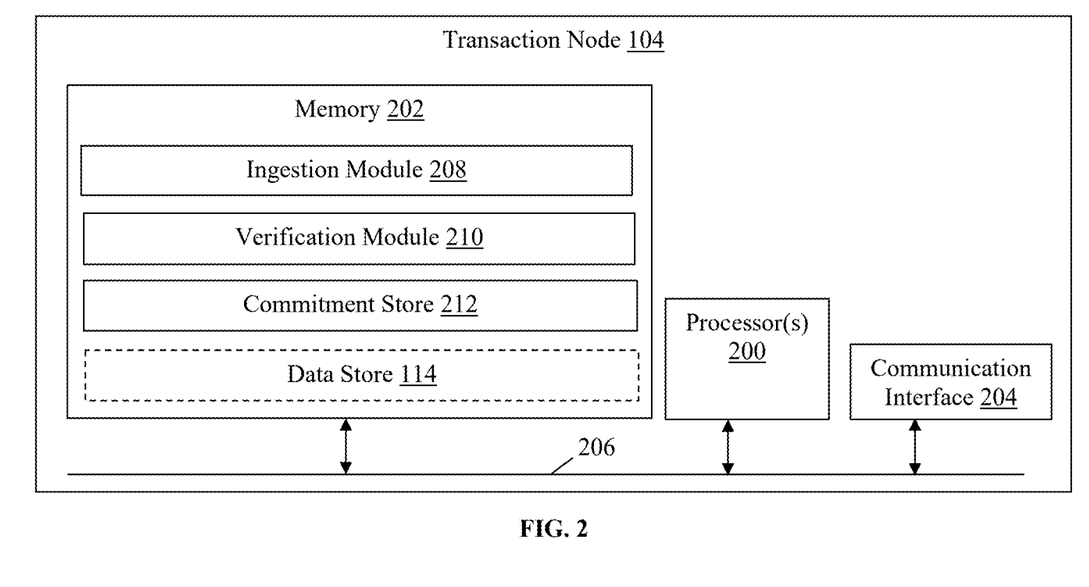
FIG. 2 is a block diagram of an exemplary transaction node.

Referring to FIGS. 1-2, an exemplary transaction node 104 of the verification system 102 is illustrated, which is representative of each of the transaction nodes 104(1)-104(n) in this example, although a subset of the transaction nodes 104(1)-104(n) can have different components and provide additional functionality, for example. The transaction node 104 may perform any number of functions, including providing interfaces to the data source(s) 112 to obtain data to be inserted into the data store(s) 114, providing interfaces to the clients 110(1)-110(n) for receiving commitment requests and provided cryptographic commitments in return, and communicating with the other transaction nodes 104(1)-104(n) to agree on the data and come to consensus on the cryptographic commitments, among other functions, as described and illustrated in more detail below.

The transaction node 104 in this example includes processor(s) 200, memory 202, and a communication interface 204, which are coupled together by a bus 206, although the transaction node 104 can include other types or numbers of elements in other configurations. Thus, the transaction node 104 can be a sever node, blockchain node, or other compute node of the decentralized network 106 that maintains a redundant copy of a ledger associated with a blockchain of the decentralized network 106. The ledger is used at least in part to maintain cryptographic commitments, as explained in more detail below.

The processor(s) 200 of the transaction node 104 may execute programmed instructions stored in the memory 202 of the transaction node 104 for any number of the functions described and illustrated herein. The processor(s) 200 may include one or more general purpose processors with one or more processing cores and/or graphics processing unit(s), for example, although other types of processor(s) can also be used.

The memory 202 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 200, can be used for the memory 202.

Accordingly, the memory 202 can store applications that can include computer executable instructions that, when executed by the processor(s) 200, cause the transaction node 104 to perform actions, such as to transmit, receive, or otherwise process network messages and requests, for example, and to perform other actions described and illustrated below. The application(s) can be implemented as components of other applications, operating system extensions, and/or plugins, for example. Further, the application(s) may be executed within or as virtual machine(s) or virtual server(s) and even the transaction node 104 itself, may be located in virtual server(s) running in a cloud-based computing environment rather than being tied to specific physical network computing devices. Also, the application(s) may be running in virtual machines (VMs) executing on the transaction node 104 and managed or supervised by a hypervisor.

In this particular example, the memory 202 includes an ingestion module 208, a verification module 210, a commitment store 212, and, optionally, a data store 114. The ingestion module 208 is configured to an interface to the decentralized network 106 for the transaction node 104 to receive data to be ingested into the data store 114 directly or indirectly from the data source(s) 112. In some examples, such as deployments in which the data source 112 is a public source, the ingestion module 208 communicates with the other transaction nodes 104(1)104(n) of the verification system 102 to achieve a quorum or consensus with respect to the correct data to be inserted into the data store 114.

With the data to be inserted identified, the ingestion module 208 generates or updates a cryptographic commitment to a data blob associated with the ingested data and stores the cryptographic commitment in the commitment store 212. In examples in which the data store 114 is a SQL database, the data blob can be a table identified in an ingestion request from the data source(s) 112. In other examples in which the data store 114 is a blockchain, the data blob can be a block in which the data (e.g., a transaction) is to be inserted or a transformed version of that block. Other types of data blobs and data stores can also be used in other examples. The updated cryptographic commitment is subsequently stored in the commitment store 212, which is a ledger of a blockchain associated with the decentralized network 106 in this example. Thus, each of the transaction nodes 104(1)-104(n) maintains a redundant copy of the commitment store 212.

The ingestion module 208 of the transaction node 104 in some examples can then insert the ingested data, in accordance with the ingestion request received from the data source 112, into a local one of the data store(s) 114 (as illustrated in FIG. 2), which can be a ledger of a blockchain, for example. In other examples, the ingestion module 208 can send the obtained data to an external one of the data store(s) 114 (as illustrate in FIG. 1) via the communication network(s) 108. In yet other examples, the ingestion module 208 can take no further action with respect to the obtained data and, instead, the data source 112 communicates directly with the data store 114 to insert the data into the data blob. Other methods for storing the ingested data can also be used in other examples.

Irrespective of how the data is stored, the cryptographic commitment generated and stored by the ingestion module 208 can be used by the verification module 210 to verify the data in response to subsequent queries, as explained in more detail below. More specifically, the verification module 210 is configured to receive commitment requests from the clients 110(1)-110(m), which include metadata associated with the data blob associated with the data. For example, the commitment request can include a table name in examples in which the data blob is a SQL database table and the data store 114 is a SQL database.

With the metadata, the verification module can retrieve the cryptographic commitment from the commitment store 212 and provide the cryptographic commitment to a requesting one of the clients 110(1)-110(m) to facilitate verification of the data against the cryptographic commitment, as explained in more detail below. Other information can be stored in the memory 202 in other examples, and other stores and/or applications or modules also can be hosted by the transaction node 104 in other examples.

The communication interface 204 of the transaction node 104 operatively couples and communicates between the transaction node 104 and other of the transaction nodes 104(1)-104(n), via the decentralized network 106, and the clients 110(1)-110(m), data source(s) 112, and/or data store(s) 114, via the communication network(s) 108 in this particular example, although other types or numbers of communication networks or systems with other types or numbers of connections or configurations to other devices or elements can also be used. The decentralized network 106 and/or communication network(s) 108 can be wide area network(s) (WAN(s)) and/or local area network(s) (LAN(s)), for example, and can use TCP/IP over Ethernet and industry-standard protocols, although other types or numbers of protocols or communication networks can be used. The decentralized network 106 and/or communication network(s) 108 can employ any suitable interface mechanisms and network communication technologies including, for example, Ethernet-based Packet Data Networks (PDNs).

While the transaction node 104 is illustrated in this example as including a single device, the transaction node 104 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the transaction node 104. Additionally, one or more of the devices that together comprise the transaction node 104 in other examples can be standalone devices or integrated with one or more other devices or apparatuses.

Each of the clients 110(1)-110(m) of the network environment 100 in this example includes any type of computing device that can exchange network data, submit queries, and receive query responses, such as mobile, desktop, laptop, or tablet computing devices, virtual machines (including cloud-based computers), or the like. Each of the clients 110(1)-110(m) in this example includes a processor, memory, and a communication interface, which are coupled together by a bus or other communication link (not illustrated), although other numbers or types of components could also be used.

Each of the clients 110(1)-110(m) may run services and/or interface applications that may provide an interface to communicate with the verification system 102 and, optionally, the data store(s) 114 via the communication network(s) 108. Each of the clients 110(1)-110(m) may further include a display device, such as a display screen or touchscreen, or an input device, such as a keyboard or mouse, for example (not shown).

The clients 110(1)-110(m) can submit queries to the data store(s) 114 and receive query responses including data. As explained above, the data store(s) 114 can be databases (e.g., SQL databases) or ledgers associated with blockchains maintained in the same or other decentralized network(s). Thus, the data store(s) 114 can be database servers or blockchain nodes, for example, each including a processor, memory, and a communication interface, which are coupled together by a bus or other communication link (not illustrated), although other numbers or types of components could also be used. Additionally, the clients 110(1)-110(m) can submit commitment requests to the verification system 102 (e.g., one of the transaction nodes 104(1)-104(n)) to obtain cryptographic commitments that can be used to verify the data in the query response, as described in more detail below.

The data ingested into the data store(s) 114, and returned with query responses, can originate from the data source(s) 112, which themselves can be databases and/or servers hosting and/or publishing data (e.g., enterprise data, stock data, or gaming data) that can subsequently be accessed in a verified manner based on the technology described and illustrated herein even though the data store(s) 114 may be hosted by an untrusted third party and/or one or more of the transaction nodes 104(1)-104(n) may be malicious. Thus, the data store(s) 114 can include a processor, memory, and a communication interface, which are coupled together by a bus or other communication link (not illustrated), although other numbers or types of components could also be used.

Although the exemplary network environment 100 with the clients 110(1)-110(m), data source(s) 112, data store(s) 114, transaction nodes 104(1)-104(n), decentralized network 106, and communication network(s) 108 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the clients 110(1)-110(m), data source(s) 112, data store(s) 114, and/or transaction nodes 104(1)-104(n), for example, may be configured to operate as virtual instances on the same physical machine. In other words, one or more of the clients 110(1)-110(m), data source(s) 112, data store(s) 114, and/or transaction nodes 104(1)-104(n) may operate on the same physical device rather than as separate devices communicating through the decentralized network 106 and/or communication network(s) 108. Additionally, there may be more or fewer clients, data source(s), data store(s), and/or transaction nodes than illustrated in FIG. 1.

The examples of this technology may also be embodied as one or more non-transitory computer readable media having instructions stored thereon, such as in the memory 202, for one or more aspects of the present technology, as described and illustrated by way of the examples herein. The instructions in some examples include executable code that, when executed by one or more processors, such as the processor(s) 200, cause the processors to carry out steps necessary to implement the methods of the examples of this technology that will now be described and illustrated herein.

Figure 3:
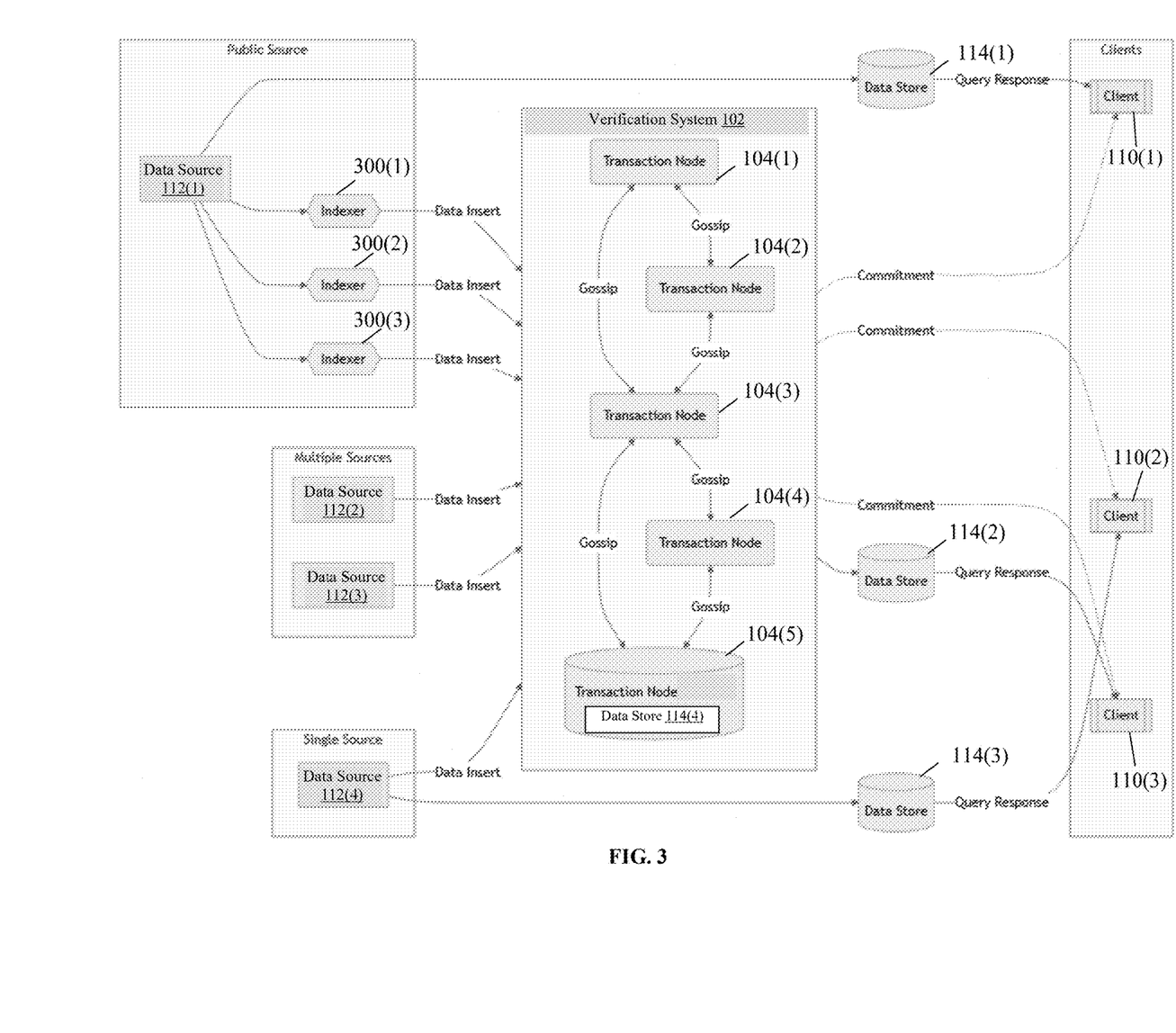
FIG. 3 is a flow diagram of an exemplary method for facilitating provable data integrity in decentralized networks.

Referring now to FIG. 3, a flow diagram of an exemplary method for facilitating provable data integrity in decentralized networks is illustrated. Production deployments of this technology may include only a subset of the several data source types (i.e., public source, multiple sources, and single source) illustrated for exemplary purposes only in FIG. 3. In some examples, the untrusted public source includes indexers 300(1)-300(3) disposed between a data source 112(1) and the verification system 102. The indexers 300(1)-300(3) and the data source 112(1) are external to the decentralized network 106 (i.e., "off-chain") and coupled to the verification system 102 via the communication network(s) 108. The indexers 300(1)-300(3) can be intermediary applications hosted by computing devices and configured to retrieve data from the data source 112(1) and send the data to the verification system 102. In some examples, the data source 112(1) is its own blockchain network, although the data source 112(1) can be a SQL database or any other type of data store.

The data can be sent by the indexers 300(1)-300(3) via transactions initiated with respect to the decentralized network 106, for example, and can include metadata regarding data blobs associated with the data. In response to the data insertion requests from the indexers 300(1)-300(3), the transaction nodes 104(1)-104(5) achieve a quorum with respect to the data. In this example, the data is such that there is only one correct version of the data and the transaction nodes 104(1)-104(5) therefore come to an agreement, consensus, or quorum using any number or type of predefined rules (e.g., the version of the data observed more frequently in the data insertion requests). In some examples, the transaction nodes 104(1)-104(5) can choose to reject the data altogether unless there is total agreement within the verification system 102 and with respect to the data associated with the data insertion requests. In other examples, other approaches can be taken as described in more detail below with respect to multiple and single source examples. Additionally, the data may be signed, accompanied by a digital signature, for authenticity requiring redundant signature verification by the transaction nodes 104(1)-104(5).

With agreement on the data, the transaction nodes 104(1)-104(5) generate or update a cryptographic commitment to the data blob associated with the data and identified in the metadata (e.g., a target table or ledger identifier) included with the data insertion request(s), as explained in more detail below. The transaction nodes 104(1)-104(5) then engage in a BFT or other consensus protocol to reach consensus on the cryptographic commitment. Upon reaching consensus, each of the transaction nodes 104(1)-104(5) updates its redundant copy of the ledger for the blockchain associated with the decentralized network 106 to include the cryptographic commitment.

In parallel, or at any other time, the data source 112(1) in this example stores the data in the data store 114(1) directly in this example. In other examples, the verification system 102 can store the data in the data store 114(4) maintained by the transaction node 104(5), and the data can be stored in other locations in other manners in yet other examples. Subsequently, the client 110(1) can query the data store 114(1) for the data while also sending a commitment request to the verification system 102. The commitment request includes the metadata associated with the data, which can be the same or different than the metadata that previously accompanied the data insertion request(s) associated with the data.

In response, the data store provides to the client 110(1) a query response including or based on the data and the verification system 102 provides to the client 110(1) the cryptographic commitment for the data. With the cryptographic commitment, the client 110(1) can verify the accuracy of the data, as explained in more detail below.

In another example including multiple sources, the process described above with reference to FIG. 3 proceeds in generally the same manner except that all of the data from both data sources 112(1)-112(3) is considered valid and accepted by the verification system 102 for insertion into the data store 114(2) without requiring any agreement or quorum among the transaction nodes 104(1)-104(5). Additionally, the verification system 102 in this example stores the ingested data into the data store 114(2) in contrast to the direct insertion by the data source 112(1) as in the public source example described above. Subsequent to the data insertion and cryptographic commitment storage, the client 110(3) can query the data store 114(2) and verify the data using the cryptographic commitment received from the verification system 102 as in the public source example described above, and as described and illustrated in more detail below.

In yet another example including a single trusted or authoritative source, the process described above with reference to FIG. 3 proceeds in generally the same manner except that all of the data (e.g., enterprise data) from the data source 112(4) is considered valid and accepted by the verification system 102 for insertion into the data store 114(3) without requiring any agreement or quorum among the transaction nodes 104(1)-104(5). Additionally, as in the public source examples, the data source 112(4) inserts the data directly into the data store 114(3). Subsequent to the data insertion and cryptographic commitment storage, the client 110(2) can query the data store 114(3) and verify the data using the cryptographic commitment received from the verification system 102 as in the public source and multiple source examples described above, and as described and illustrated in more detail below.

In yet other examples in which the ingested data is inserted by the verification system into the data store 114(4), the clients 110(1)-110(3) can both query the verification system 102 for the data and request a cryptographic commitment for the data from the verification system 102. Other permutations of the types of data sources 112 and/or locations of the data stores 114, and/or other network topologies, can also be used in other exemplary deployments of this technology.

Figure 4:
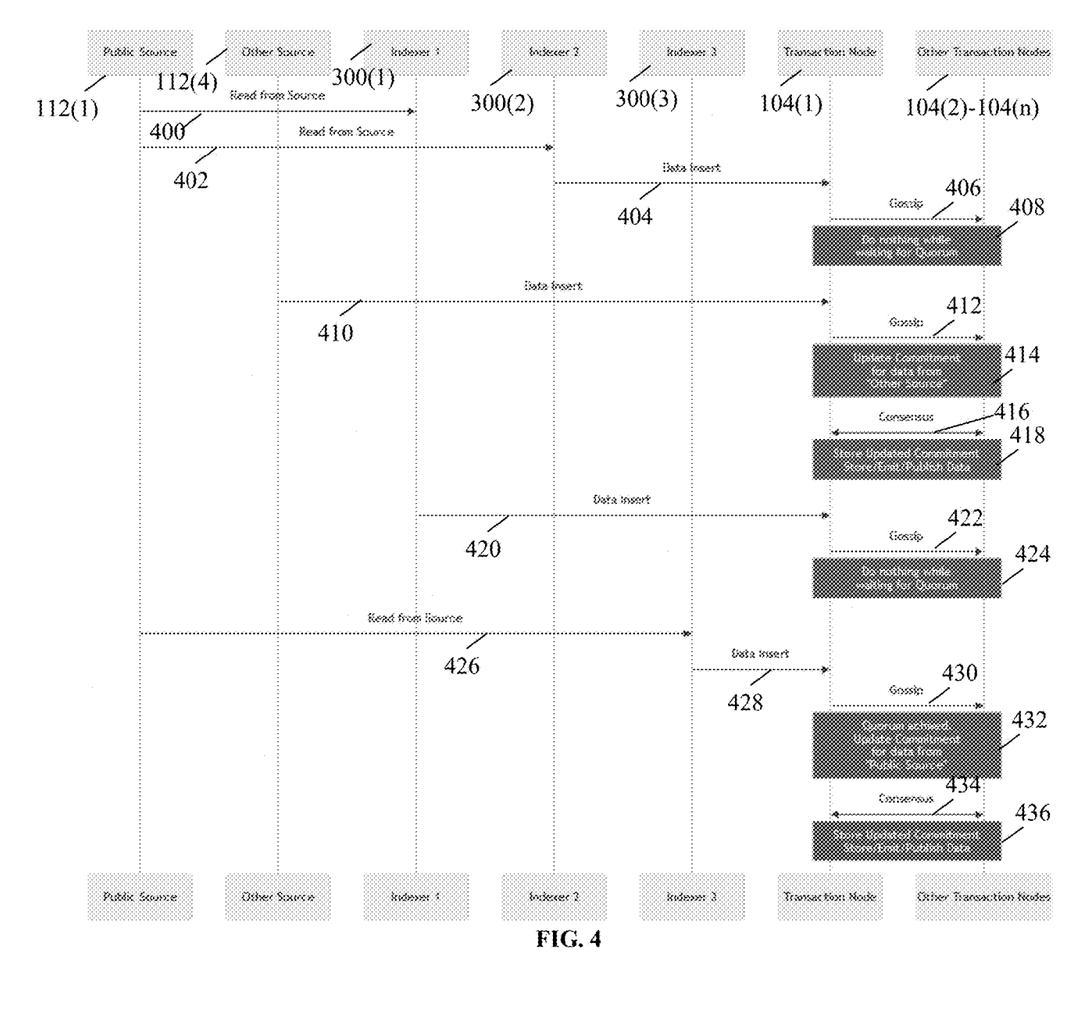
FIG. 4 is a timing diagram of an exemplary method for ingesting data and maintaining cryptographic commitments to facilitate query result verification.

Referring now to FIG. 4, a timing diagram of an exemplary method for ingesting data and maintaining cryptographic commitments to facilitate query result verification is illustrated. In step 400 in this example, the indexer 300(1) reads data from a public source, which in this example is the data source 112(1). In step 402, the indexer 300(1) reads data from the same public source (i.e., data source 112(1)) and, in step 404, sends a data insertion request (e.g., in the form of a transaction) to the transaction node 104(1) before indexer 300(1) sends a data insertion request with respect to the data it obtained in step 400.

In step 406, the transaction node 104(1) communicates (referred to in FIG. 4 as "gossip") with the other transaction nodes 104(2)-104(n) to attempt to achieve a quorum with respect to the data. In this example, no other data insertion request has yet been received and therefore a quorum cannot be reached. Thus, in step 408, the transaction node 104(1) effectively waits for a quorum to be achieved.

In step 410, another source, which is the data source 112(4) associated with the single source example explained above with reference to FIG. 3, sends a data insertion request (e.g., in the form of a transaction) to the transaction node 104(1). In step 412, the transaction node 104(1) communicates with the other transaction nodes 104(2)-104(n) to inform those nodes of the data received by the verification system 102. Since the data is from the data source 112(4), it is accepted in this example without requiring any quorum or other agreement among the transaction nodes 104(1) 104(n) of the verification system 102.

In step 414, each of the transaction nodes 104(1)-104(n) generates or updates the stored cryptographic commitment for a data blob (e.g., SQL database table or blockchain ledger) identified in the metadata of the data insertion request received in step 410 and associated with the data to be inserted. In this example in which the cryptographic commitment is updated, each of the transaction nodes 104 (1)-104(n) stores a redundant copy of the commitment store 212 (e.g., in the form of a ledger associated with a blockchain of the decentralized network 106), which can be accessed based on the identified data blob to obtain the current cryptographic commitment. The current cryptographic commitment is then updated at each of the transaction nodes 104(1)-104(n) based on the data associated with the data insertion request received in step 410 and distributed to the other transaction nodes 104(2)-104(n) in step 412.

The cryptographic commitment in this example is a relatively small "digest" of the data, which holds sufficient information to subsequently ensure that the data is not tampered with. In the examples described and illustrated herein, the cryptographic commitment is advantageously updatable by the transaction nodes 104(1)-104(n) without requiring the access to the old, existing data in the same data blob. While other cryptographic commitment schemes can be used with this technology to generate other types of commitments, including and FRI commitments, two exemplary cryptographic commitment schemes will now be described including the Kate-Zaverucha-Goldberg (KZG) commitment scheme and the Pedersen commitment scheme.

A Pedersen commitment scheme lends itself to relatively fast development and has advantageous mathematical properties. In one particular example, $a_0, a_1, a_2, \ldots$ is a column of data (e.g., in a SQL database table) and the Pedersen commitment is $a_0 \cdot G_0 + a_1 \cdot G_1 + a_2 \cdot G_2 + \ldots$, where the $G_i$'s are "random," public, and transparent parameters that do not require a trusted setup phase, as is required by some other commitment schemes. Pedersen commitments are also relatively easily updatable such that all that needs to be done to append to a commitment is to add an extra term to the above sum for each new piece of data.

Further, Pedersen commitment computation speed can be improved using Curve25519 as an elliptic curve and the GPU(s) 302 for parallel processing. Curve25519 is described in Bernstein, Daniel, Curve25519: New Diffie-Hellman Speed Records, 2016, 3958, 207-228. 10.1007/11745853_14, which is incorporated by reference herein in its entirety. Pedersen commitments are further described in Pedersen, T. P., "Non-Interactive and Information-Theoretic Secure Verifiable Secret Sharing," Advances in Cryptology—CRYPTO '91 (pp. 129-140), Springer Berlin Heidelberg, which is incorporated by reference herein in its entirety.

The substantially similar KZG commitment scheme is often used to produce ZK proofs and requires a set of generators $g_0, g_1, g_2, g_3 \ldots$, for which there are trusted setup requirements but are publicly available and published to the entire network. In order to compute a cryptographic commitment to a vector of data $(d_0, d_1, d_2, \ldots, d_n)$ which may be associated with a data blob, one of the transaction nodes 104(1) computes $\text{Commit}_{KZG} = d_0 g_0 + d_1 g_1 + \ldots + d_n g_n$. The KZG commitment scheme is cryptographically collision resistant and advantageously efficiently updatable.

In particular, to add new data to the vector $(d_{n-1}, d_{n+2}, \ldots, d_m)$ one of the transaction nodes 104(1) takes the old cryptographic commitment and adds the new data: $\text{Commit}_{KZG}^{new} = \text{Commit}_{KZG}^{old} + d_{n-1} g_{n+1} + d_{n+2} g_{n+2} + \ldots + d_m g_m$. The KZG commitment scheme is described in more detail in Kate, Aniket et al., "Constant-Size Commitments to Polynomials and Their Applications," ASIACRYPT 2010, Dec. 1, 2010, which is incorporated by reference herein in its entirety.

In step 416, each of the transaction nodes 104(1)-104(n) engages in a consensus protocol (e.g., a BFT consensus protocol) to agree on the cryptographic commitment, which may involve multiple rounds of communication to ensure that all non-faulty or non-malicious transaction nodes reach agreement, even in the presence of some faulty or malicious transaction nodes. While the BFT consensus protocol provides robustness against various types of failures and attacks, in other examples, other types of consensus protocol can be used, including the Raft consensus protocol in examples in which the deployment does not require zero trust.

In step 418 in this example, upon reaching consensus on the cryptographic commitment in step 416, the updated cryptographic commitment is stored by each of the transaction nodes 104(1) 104(n) in its respective copy of the commitment store 212. For example, the transaction nodes 104(1) 104(n) can add the updated cryptographic commitment to a ledger associated with the blockchain of the decentralized network 106. This process ensures that all of the transaction nodes 104(1)-104(n) maintain a consistent and tamper-evident view of the cryptographic commitment data. By maintaining redundant copies of the ledger and cryptographic commitments across multiple transaction nodes, the verification system 102 advantageously ensures high availability and fault tolerance.

Additionally, by storing the updated cryptographic commitment in blocks produced by the decentralized network 106 (e.g. a blockchain), the inherent security properties of blockchain technology are leveraged in which each block is cryptographically linked to its predecessor and replicated across a global network of decentralized transaction nodes 104(1)-104(n), creating an immutable and tamper-evident record of all cryptographic commitments. By embedding the cryptographic commitments within the blockchain, the verification system 102 provides a transparent and verifiable audit trail by which a third-party verifier service can independently validate that the cryptographic commitments provided are authentic. This integration ensures that the cryptographic commitments, once recorded, cannot be altered without detection, thereby providing the verifier service with a high degree of confidence in the accuracy and integrity of the cryptographic commitments used in the ZK proof or other downstream verification process.

Optionally, cryptographic techniques such as Boneh-Lynn-Shacham (BLS) threshold signatures or multi-signatures can be used to provide a "trustless" mechanism for a third-party verifier service to validate the cryptographic commitments provided to it have not been forged. An exemplary BLS signature scheme is described in Boneh, Dan et al., "Short Signatures from the Weil Pairing," Journal of Cryptology. 17 (4): 297-319, 2004, which is incorporated by reference herein in its entirety. During the consensus process (e.g., the BFT consensus protocol), the transaction nodes 104(1)-104(n) can collaboratively generate these signatures. By requiring a threshold number of the transaction nodes 104(1)-104(n) to sign each cryptographic commitment, the verification system 102 can ensure that no single one of the transaction nodes 104(1)-104(n), or small subset of the transaction nodes 104(1)-104(n), can unilaterally alter the cryptographic commitments, thereby safeguarding against malicious actors.

Additionally, in step 418, at least one of the transaction nodes 104(1)-104(n) optionally stores the ingested data associated with the data insert request received in step 410 in the data blob in a local data store (e.g., data store 114(4)) or emits or publishes the ingested data to facilitate insertion of the ingested data into the data blob in an external data store (e.g., data store 114(2)). Other methods for storing the ingested data can also be used, including as described and illustrated above with reference to FIG. 3.

In step 420, the indexer 300(1) sends a data insertion request (e.g., in the form of a transaction) to the transaction node 104(1) with respect to the data it obtained in step 400. In step 422, the transaction node 104(1) communicates with the other transaction nodes 104(2)-104(n) to attempt to achieve a quorum with respect to the data. In this example, only one other data insertion request has been received by the verification system 102 (in step 404) and therefore a quorum cannot be reached. Thus, in step 424, the transaction node 104(1) effectively waits for a quorum to be achieved. data.

In step 426, the indexer 300(3) reads data from the public data source 112(1) and, in step 428, sends a data insertion request (e.g., in the form of a transaction) to the transaction node 104(1). In step 430, the transaction node 104(1) communicates with the other transaction nodes 104(2)-104(n) to attempt to achieve a quorum with respect to the data. While the data insertion requests in steps 410 and 428 are illustrated in FIG. 4 as being received by the transaction node 104(1) in this example, one or both of those data insertion requests could have been received by any of the transaction nodes 104(1)-104(n) of the verification system 102 in other examples.

In step 432, the verification system determines that a quorum has been achieved with respect to the data and the cryptographic commitment for the data blob identified in the data insertion request received in step 428, for example, is updated. The cryptographic commitment can be updated as described above with reference to step 414. In step 434, each of the transaction nodes 104(1) 104(n) engages in a consensus protocol (e.g., a BFT consensus protocol) to agree on the updated cryptographic commitment, as explained above with reference to step 416.

In step 436, upon reaching consensus on the updated cryptographic commitment in step 432, the updated cryptographic commitment is stored by each of the transaction nodes 104(1) 104(n) in its respective copy of the commitment store 212. For example, the transaction nodes 104(1) 104(n) can add the updated cryptographic commitment to a ledger associated with the blockchain of the decentralized network 106, as described above with reference to step 418, for example. While several types of data ingestion from different types of data sources have been described with reference to FIG. 4 for exemplary purposes, other examples of this technology could have one or more different methods for the transaction nodes 104(1)-104(n) to obtain data to be ingested or inserted into a data store 114 and/or more or fewer types of data sources 112. Additionally, one or more of steps 400-436 could occur in a different order in other examples.

Figure 5:
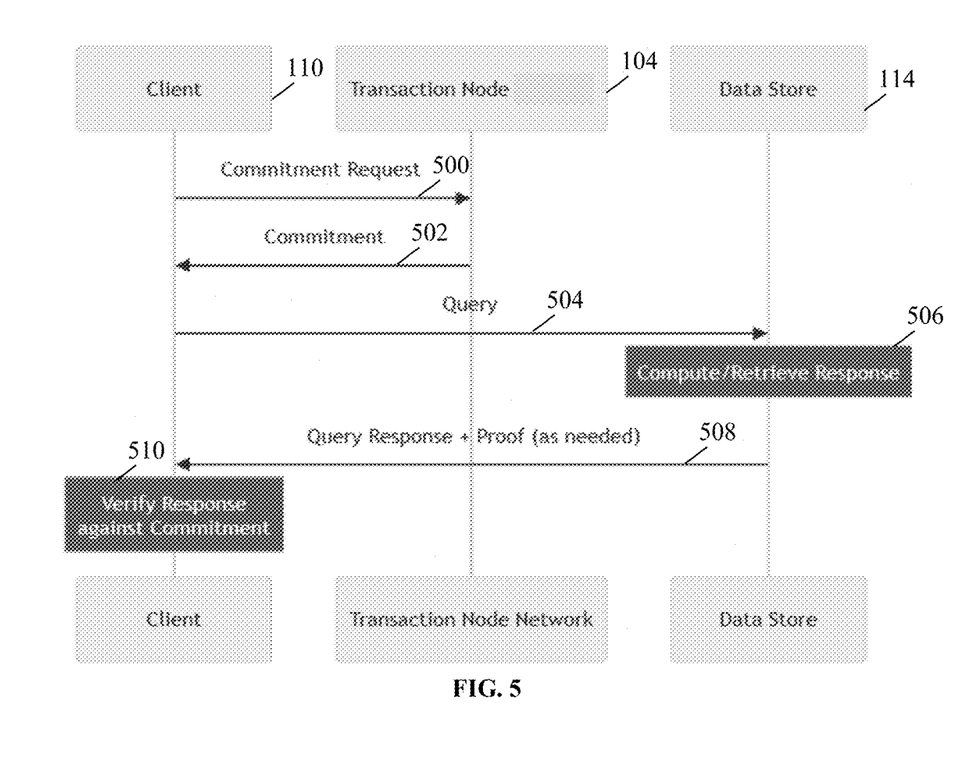
FIG. 5 is a timing diagram of an exemplary method for verifying query results using cryptographic commitments maintained by transaction nodes of a decentralized network.

Referring now to FIG. 5, a timing diagram of an exemplary method for verifying query results using cryptographic commitments maintained by transaction nodes of a decentralized network is illustrated. In step 500 in this example, the client 110 sends a commitment request to the transaction node 104. The commitment request can include metadata associated with a data blob corresponding to the data, such as a SQL database table name or an identifier of a blockchain ledger, for example.

In step 502, the transaction node 104 obtains a cryptographic commitment for the data blob identified in the metadata of the commitment request from the commitment store 212. The transaction node 104 then returns the obtained cryptographic commitment to the requesting client 110.

In step 504, the client 110 queries the data store 114 for the data, such as to perform an operation on the data, for example. Thus, in step 506, the data store 114 retrieves the data or executes a computation on the data to perform the identified operation associated with the query, for example. As explained above, the data store 114 can be maintained within the verification system 102 (e.g., data store 114(4)) or external do the verification system 102 (e.g., data stores 114(1)-114(3). Irrespective of the location or trustworthiness of the data store, the cryptographic commitment returned to the client 1110 by the transaction node 104 in step 502 can be used to verify the query result or response generated in step 506.

More specifically, in step 508, the data store 114 returns to the client 110 a response to the query of step 504 that includes the data retrieved in step 506, and/or a computation derived therefrom. In some implementations of this technology, the data store can be or can host a verifier service that generates a proof optionally using a method similar to the Pederson commitment scheme described in Bunz, Benedikt, "Bulletproofs: Short Proofs for Confidential Transactions and More," 2018 IEEE Symposium on Security and Privacy (SP), 20-24 May 2018, which is incorporated by reference herein in its entirety, although other schemes and methods for generating the proof can also be used. Also optionally, the proof can be non-interactive using the Fiat-Shamir heuristic, for example.

In step 510, the client 110 verifies the query response received in step 508 against the cryptographic commitment received in step 502. In some examples, the client 110 can use the received cryptographic commitment to check the proof received from the data store 114 against the query result received from the data store 114, and thereby verify whether the data store 114 has produced a trustworthy result to the query sent in step 504. Optionally, the proof can be generated by the data store 114 in step 508, and the query response can be verified against the cryptographic commitment received in step 502, as described and illustrated in more detail in U.S. Pat. No. 11,947,525, which is incorporated by reference herein in its entirety. Other methods for generating a proof and/or verifying the query response against the commitment can also be used in other examples.

As described and illustrated by way of the examples herein, this technology more effectively and efficiency facilitates trust for query results generated from untrusted data stores. In some examples, this technology leverages a consensus protocol to maintain and update cryptographic commitments representing data blobs. The cryptographic commitments facilitate query result verification for downstream applications requiring verifiable and tamper-evident data, such as ZK proofs of computations over data, for which the integrity of the underlying data must be provably maintained.

By maintaining redundant copies of a ledger of cryptographic commitments across multiple transaction nodes, this technology provides resilience against faulty or malicious transaction nodes, while ensuring integrity and high availability. The consensus mechanism described and illustrated herein for cryptographic commitments provides robustness against various types of failures and attacks, and the use of cryptographic commitments ensures that any tampering with the stored data can be efficiently detected. Moreover, the cryptographic commitments are updatable to enable efficient proof generation and verification queries, enhancing the usability of the ledger in cryptographic applications.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A non-transitory computer readable medium having stored thereon instructions comprising executable code that, when executed by one or more processors of one of a plurality of transaction nodes in a decentralized network, causes the one or more processors to:
update a cryptographic commitment to a data blob based on data to be inserted into the data blob and ingested via one or more first communication networks from at least one data source, wherein the cryptographic commitment is updated without accessing other data existing in the data blob and facilitates verification of a response to a query associated with the data blob; and
store the updated cryptographic commitment in a distributed ledger replicated at each of the plurality of transaction nodes upon obtaining agreement on the updated cryptographic commitment with a first one or more of the plurality of transaction nodes based on a consensus protocol, wherein the ingested data is inserted in the data blob in a data store.

2. The non-transitory computer readable medium of claim 1, wherein the consensus protocol comprises a Byzantine Fault Tolerant (BFT) consensus protocol.

3. The non-transitory computer readable medium of claim 1, wherein the executable code, when executed by the one or more processors, further causes the one or more processors to publish the ingested data to facilitate insertion of the ingested data into the data blob in the data store.

4. The non-transitory computer readable medium of claim 1, wherein the decentralized network comprises a blockchain network and the distributed ledger comprises a blockchain.

5. The non-transitory computer readable medium of claim 1, wherein the executable code, when executed by the one or more processors, further causes the one or more processors to provide the updated cryptographic commitment to a client in response to a commitment request received from the client to facilitate verification by the client of the query response against the updated cryptographic commitment, wherein the query response is provided by the data store and the commitment request comprises metadata associated with the data blob.

6. The non-transitory computer readable medium of claim 1, wherein the data store comprises Structured Query Language (SQL) database and the data blob comprises a table of the SQL database.

7. The non-transitory computer readable medium of claim 1, wherein the executable code, when executed by the one or more processors, further causes the one or more processors to send the ingested data to the data store via one or more second communication networks that are separate from the decentralized network.

8. The non-transitory computer readable medium of claim 4, wherein the ingested data comprises a transaction and the data blob comprises a block of the blockchain or a transformed version of the block.

9. The non-transitory computer readable medium of claim 1, wherein the executable code, when executed by the one or more processors, further causes the one or more processors to sign the updated cryptographic commitment using a signature generated collaboratively with a second one or more of the plurality of transaction nodes before storing the updated cryptographic commitment in the distributed ledger.

10. The non-transitory computer readable medium of claim 1, wherein the executable code, when executed by the one or more processors, further causes the one or more processors to update the cryptographic commitment after reaching consensus with a second one or more of the plurality of transaction nodes with respect to the ingested data.

11. A transaction node in a decentralized network comprising a plurality of transaction nodes, wherein the transaction node comprises memory having instructions stored thereon and one or more processors coupled to the memory and configured to execute the instructions to:
update a cryptographic commitment to a data blob based on data to be inserted into the data blob and ingested via one or more first communication networks from at least one data source, wherein the cryptographic commitment is updated without accessing other data existing in the data blob and facilitates verification of a response to a query associated with the data blob; and
store the updated cryptographic commitment in a distributed ledger replicated at each of the plurality of transaction nodes upon obtaining agreement on the updated cryptographic commitment with a first one or more of the plurality of transaction nodes based on a consensus protocol, wherein the ingested data is inserted in the data blob in a data store.

12. The transaction node of claim 11, wherein the consensus protocol comprises a Byzantine Fault Tolerant (BFT) consensus protocol.

13. The transaction node of claim 11, wherein the one or more processors are further configured to execute the instructions to publish the ingested data to facilitate insertion of the ingested data into the data blob in the data store.

14. The transaction node of claim 11, wherein the decentralized network comprises a blockchain network and the distributed ledger comprises a blockchain.

15. The transaction node of claim 11, wherein the one or more processors are further configured to execute the instructions to provide the updated cryptographic commitment to a client in response to a commitment request received from the client to facilitate verification by the client of the query response against the updated cryptographic commitment, wherein the query response is provided by the data store and the commitment request comprises metadata associated with the data blob.

16. The transaction node of claim 11, wherein the data store comprises Structured Query Language (SQL) database and the data blob comprises a table of the SQL database.

17. The transaction node of claim 11, wherein the one or more processors are further configured to execute the instructions to send the ingested data to the data store via one or more second communication networks that are separate from the decentralized network.

18. The transaction node of claim 14, wherein the ingested data comprises a transaction and the data blob comprises a block of the blockchain or a transformed version of the block.

19. The transaction node of claim 11, wherein the one or more processors are further configured to execute the instructions to sign the updated cryptographic commitment using a signature generated collaboratively with a second one or more of the plurality of transaction nodes before storing the updated cryptographic commitment in the distributed ledger.

20. The transaction node of claim 11, wherein the one or more processors are further configured to execute the instructions to update the cryptographic commitment after reaching consensus with a second one or more of the plurality of transaction nodes with respect to the ingested data.

21. A method implemented by one of a plurality of transaction nodes in a decentralized network, wherein the method comprises:

updating a cryptographic commitment to a data blob based on data to be inserted into the data blob and ingested via one or more first communication networks from at least one data source, wherein the cryptographic commitment is updated without accessing other data existing in the data blob and facilitates verification of a response to a query associated with the data blob; and storing the updated cryptographic commitment in a distributed ledger replicated at each of the plurality of transaction nodes upon obtaining agreement on the updated cryptographic commitment with a first one or more of the plurality of transaction nodes based on a consensus protocol, wherein the ingested data is inserted in the data blob in a data store.

22. The method of claim 21, wherein the consensus protocol comprises a Byzantine Fault Tolerant (BFT) consensus protocol.

23. The method of claim 21, further comprising publishing the ingested data to facilitate insertion of the ingested data into the data blob in the data store.

24. The method of claim 21, wherein the decentralized network comprises a blockchain network and the distributed ledger comprises a blockchain.

25. The method of claim 21, further comprising providing the updated cryptographic commitment to a client in response to a commitment request received from the client to facilitate verification by the client of the query response against the updated cryptographic commitment, wherein the query response is provided by the data store and the commitment request comprises metadata associated with the data blob.

26. The method of claim 21, wherein the data store comprises Structured Query Language (SQL) database and the data blob comprises a table of the SQL database.

27. The method of claim 21, further comprising sending the ingested data to the data store via one or more second communication networks that are separate from the decentralized network.

28. The method of claim 24, wherein the ingested data comprises a transaction and the data blob comprises a block of the blockchain or a transformed version of the block.

29. The method of claim 21 further comprising signing the updated cryptographic commitment using a signature generated collaboratively with a second one or more of the plurality of transaction nodes before storing the updated cryptographic commitment in the distributed ledger.

30. The method of claim 21, further comprising updating the cryptographic commitment after reaching consensus with a second one or more of the plurality of transaction nodes with respect to the ingested data.

* * * * *